April 9, 1963 R. P. BURR ET AL 3,084,420

METHOD OF MAKING AN ENDLESS ELECTRICAL WINDING

Filed March 3, 1960

INVENTORS
ROBERT P. BURR
ROBERT L. SWIGGETT
BY
Charles A. Blank
ATTORNEY

United States Patent Office 3,084,420

Patented Apr. 9, 1963

3,084,420
METHOD OF MAKING AN ENDLESS ELECTRICAL WINDING

Robert P. Burr, Lloyd Harbor, Huntington, and Robert L. Swiggett, Huntington, N.Y., assignors to Circuit Research Company, Cold Spring Harbor, N.Y., a partnership Filed Mar. 3, 1960, Ser. No. 12,580
7 Claims. (Cl. 29—155.5)

This invention relates to methods of making endless electrical windings, for example, armature or field windings for electromechanical energy converters and, more particularly, to methods of making printed-circuit armatures of an endless belt type, for example, cylindrical armatures. Such armatures may, for example, have printed, plated or etched conductors or equivalents thereof.

Motors utilizing endless belt armatures are described and claimed in a co-pending application of R. P. Burr, Serial No. 800,254, filed March 18, 1959, and entitled "Electromechanical Energy Converter and Method of Making Member Thereof." The present invention relates to an improved method of making armatures suitable for use in such printed-circuit motors.

It is an object of the present invention, therefore, to provide a new and improved method of making economically an endless electrical winding for an electromechanical energy converter.

It is another object of the invention, to provide a new and improved method of making a printed-circuit motor armature, which method is adapted for use in mass production of armatures.

In accordance with the invention, a method of making an endless electrical winding comprises forming on a sheet a repetitive pattern of conductors having predetermined lengths extending obliquely relative to a reference line and applying an insulating material to the surface of the sheet. The method also comprises forming the sheet along the reference line into layers of double conductor thickness over the central portion thereof and of single conductor thickness at the end portions thereof with the insulating material between the formed portions of the conductive pattern, positioning the ends of the sheet with the end portions of single conductor thickness in overlapping relation to form an endless band of double conductor thickness, and conductively connecting the adjacent ends of different conductors to form a continuously conductive endless winding.

For a better understanding of the present invention, together with other and further objects thereof, reference is made to the following description, taken in connection with the accompanying drawings, and its scope will be pointed out in the appended claims.

Referring to the drawings.

Figure 1:
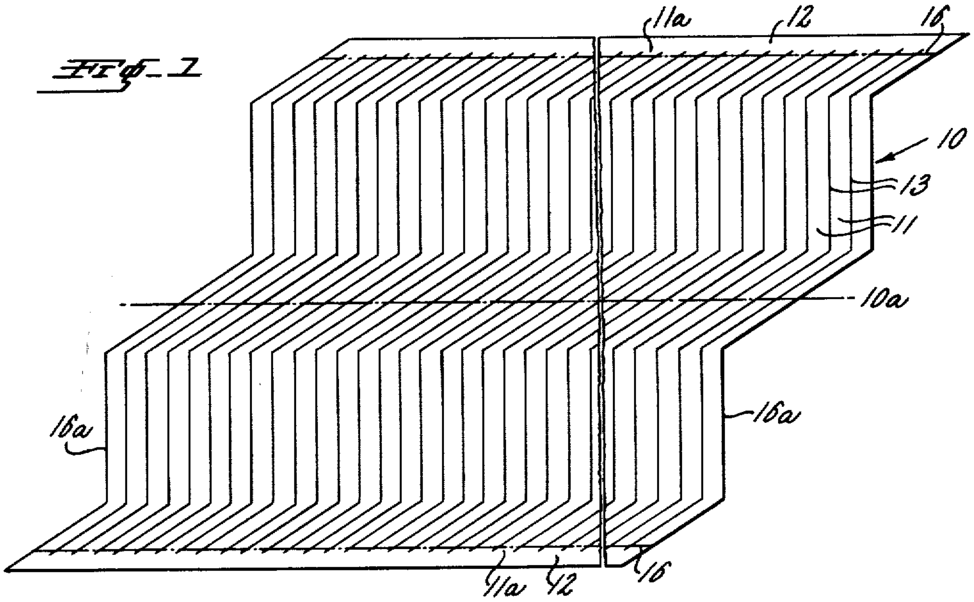
FIG. 1 is a fragmentary plan view of a repetitive conductor pattern on a sheet.

Referring now more particularly to FIG. 1 of the drawings, a conductive sheet 10 of copper may be perforated or punched in the pattern indicated by the transverse lines 13 to form conductors 11 joined at their ends by bridges 12. The black lines 13 of the drawings represent the space between conductors.

The repeating pattern of conductors on the substantially planar sheet may also be formed by conventional techniques for the manufacture of printed circuits involving, for example, printing the desired etch-resist pattern on a conductive sheet and etching the sheet to form the desired pattern.

As will be apparent from the drawing, the conductors extend transversely of the sheet 10 with adjacent conductors 11 separated by a space 13 of substantially less width than one conductor. The space between conductors may, for example, be .010 inch and the width of a conductor may, for example, be .100 inch. The length of the conductors 11 may, for example, be 1.5 inches, and the thickness of the conductors 11 may, for example, be .005 inch. The pattern of FIG. 1 is a continuous wave-wound armature pattern but other armature patterns, for example, lap-wound patterns can be manufactured in accordance with the invention.

The method also comprises applying an insulating material to the surface of the sheet 10. The insulating material preferably is an insulating adhesive tape 15, for example, a Mylar tape of .001 inch thickness having longitudinal edges 16, represented in broken line. Mylar is a commercially available polyester film made by E. I. du Pont de Nemours & Company, Inc. The tape preferably is applied with the adhesive against the conductors 11 to cover substantially the entire surface of the conductors except edges **11*a* of the conductors to be soldered, and the outer bridges. The tape is cut to coincide at its lateral ends 16*a* with the ends of the conductive sheet. If desired, a tape coated on both sides with adhesive and extending only from longitudinal center line 10*a* to one longitudinal edge 16** of the conductive sheet may be utilized.

Figures 2, 3, 4, 5:
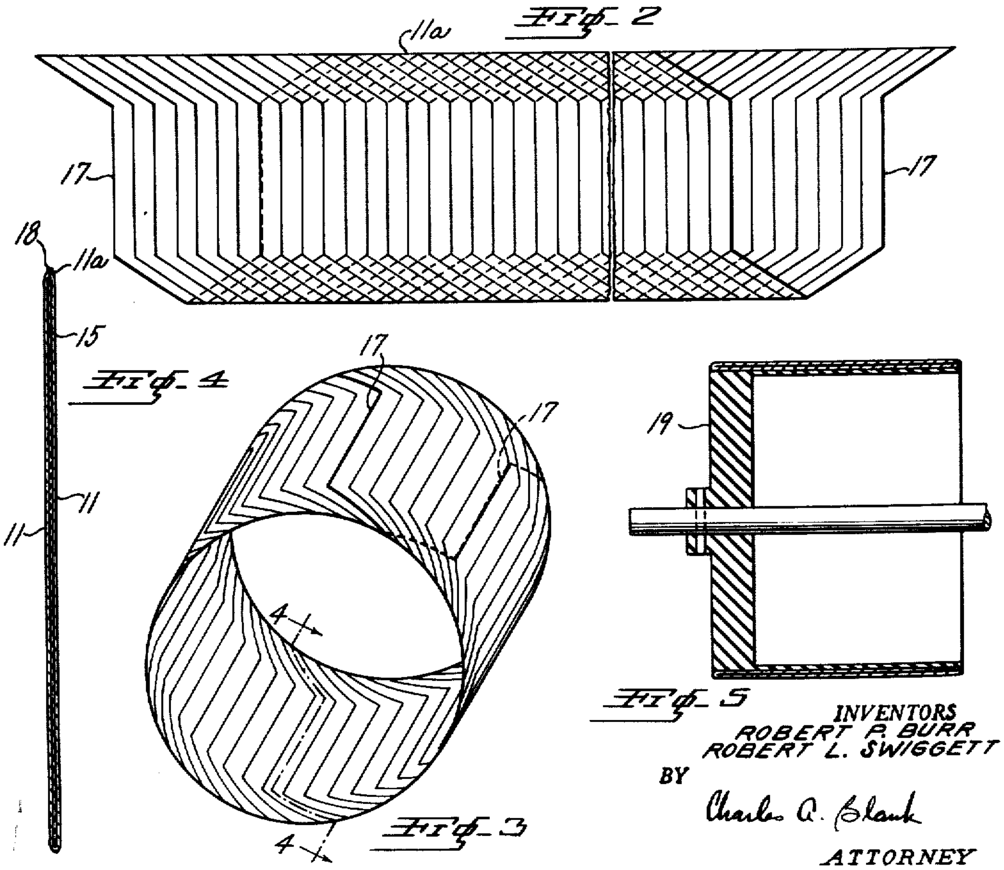
FIG. 2 is a fragmentary plan view of the FIG. 1 sheet after folding.
FIG. 3 is a perspective view of the sheet after rolling and electrically interconnecting the conductors.
FIG. 4 is a sectional view of the FIG. 3 armature taken along lines 4—4 of FIG. 3.
FIG. 5 is a sectional view of the FIG. 4 armature mounted on a suitable shaft and support.

The sheet is then formed by folding along its longitudinal center line **10*a* with the insulating material between the folded portions of the conductive pattern to form the configuration represented in FIG. 2 with the edges of conductors 11 on opposite sides of the insulating tape 15 in registry. As represented in FIG. 3, the ends 17 of the sheet are then positioned in overlapping relation to form an endless band or rolled to form a cylinder. Adjacent ends 11*a* of the conductors are electrically conductively connected to form a continuously conductive armature. As represented in FIG. 4, the tape 15 extends to the edges of the conductors after the bridges 12 have been removed and the adjacent ends of conductors 11 may be electrically connected by dip-soldering to form conductive connections 18. As represented in FIG. 5, the armature may then be mounted on a suitable support 19** of insulating material for use in a six-pole motor of the type described in the aforementioned co-pending application. To this end, the armature may, for example, comprise 47 conductors on its inner surface and 47 conductors on its outer surface.

If desired, the armature may include a suitable cylindrical backing sheet electrically insulated from the conductors of the armature to provide additional support. This sheet may be originally attached to the underside of the upper half of the FIG. 1 sheet of conductors and rolled with the conductive sheet during the manufacture of the armature. Alternatively, the conductive sheet may be a conductive coating on an insulating sheet.

From the foregoing description, it will be apparent that a method in accordance with the invention for making an armature is economical and suitable for commercial use in the mass production manufacture of printed-circuit armatures.

While there has been described what is at present considered to be the preferred method in accordance with this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. The method of making an endless electrical winding comprising: forming on a sheet a repetitive pattern of conductors having predetermined lengths extending obliquely relative to a reference line; applying an insulating material to the surface of the sheet; forming the sheet into layers of double conductor thickness over the central portion thereof and of single conductor thickness at the end portions thereof with the insulating material between the formed portions of the conductive pattern; positioning the ends of the sheet along the reference line with said end portions of single conductor thickness in overlapping relation to form an endless band of double conductor thickness; and conductively connecting the adjacent ends of different conductors to form a continuously conductive endless winding.

2. The method of making an armature for an electromechanical energy converter comprising: perforating a conductive substantially planar sheet to form a repetitive pattern of conductors having predetermined lengths extending obliquely relative to a reference line; applying an insulating material to the surface of the sheet; folding the sheet along the reference line into layers of double conductor thickness over the central portion thereof and of single conductor thickness at the end portions thereof with the insulating material between the folded portions of the conductive pattern; positioning the ends of the sheet with said end portions of single conductor thickness in overlapping relation to form an endless band of double conductor thickness; and conductively connecting the adjacent ends of different conductors to form a continuously conductive armature.

3. The method of making an armature for an electromechanical energy converter comprising: forming conductors extending transversely of a sheet with adjacent conductors separated by a space of substantially less width than a conductor and with the conductors in a repeating pattern along the sheet and with the conductors having terminal lengths and intermediate lengths, the terminal lengths and predetermined intermediate lengths extending obliquely relative to a reference line; applying an insulating material to the surface of the sheet; folding the sheet into layers of double conductor thickness over the central portion thereof and of single conductor thickness at the end portions thereof with the insulating material between the folded portions of the conductive pattern; positioning the ends of the sheet along the reference line with said end portions of single conductor thickness in overlapping relation to form an endless band of double conductor thickness; and conductively connecting the adjacent ends of different conductors to form a continuously conductive armature.

4. The method of making an armature for an electromechanical energy converter comprising: forming a continuous wave-wound armature pattern of conductors on a sheet; applying an insulating material to the surface of the sheet; folding the sheet into layers of double conductor thickness over the central portion thereof and of single conductor thickness at the end portions thereof with the insulating material between the folded portions of the conductive pattern; rolling the sheet with said end portions of single conductor thickness in overlapping relation to form an endless band of double conductor thickness; and conductively connecting the adjacent ends of the conductors to form a continuously conductive pattern.

5. The method of making an armature for an electromechanical energy converter comprising: forming on a sheet a repetitive pattern of conductors having predetermined lengths extending obliquely relative to a reference line; applying an adhesive insulating tape to the surface of the sheet; folding the sheet along the reference line into layers of double conductor thickness over the central portion thereof and of single conductor thickness at the end portions thereof with the insulating material between the folded portions of the conductive pattern; rolling the sheet with said end portions of single conductor thickness in overlapping relation to form an endless band of double conductor thickness; and conductively connecting the adjacent ends of different conductors to form a continuously conductive armature.

6. The method of making an armature for an electromechanical energy converter comprising: forming on a sheet a repetitive pattern of conductors having predetermined lengths extending obliquely relative to a reference line; applying an insulating material to the surface of the sheet; folding the sheet along the reference line into layers of double conductor thickness over the central portion thereof and of single conductor thickness at the end portions thereof with the insulating material between the folded portions of the conductive pattern; rolling the sheet with said end portions of single conductor thickness in overlapping relation to form a cylinder of double conductor thickness; and conductively connecting the adjacent ends of different conductors to form a continuously conductive armature.

7. The method of making an armature for a printed-circuit motor comprising: perforating a conductive substantially planar sheet to form a repetitive pattern of conductors extending transversely and obliquely of the sheet with adjacent conductors separated by a space of substantially less width than a conductor and connected at their edges by longitudinal bridges; applying an adhesive insulating tape to the surface of the sheet with the adhesive against the conductors; folding the sheet substantially along its longitudinal center line into layers of double conductor thickness over the central portion thereof and of single conductor thickness at the end portions thereof with the insulating material between the folded portions of the conductive pattern; removing the longitudinal bridges from the edges of the conductors; rolling the sheet with said end portions of single conductor thickness in overlapping relation to form a cylinder of double conductor thickness; and conductively connecting the adjacent ends of different conductors to form a continuously conductive armature.

References Cited in the file of this patent

UNITED STATES PATENTS

| | | |
|---|---|---|
| 2,441,960 | Eisler | May 25, 1948 |
| 2,611,040 | Brunetti | Sept. 16, 1952 |
| 2,634,310 | Eisler | Apr. 7, 1953 |

UNITED STATES PATENT OFFICE

CERTIFICATE OF CORRECTION

Patent No. 3,084,420 April 9, 1963

Robert P. Burr et al.

It is hereby certified that error appears in the above numbered patent requiring correction and that the said Letters Patent should read as corrected below.

Column 3, lines 12 and 49, before "into", each occurrence, insert -- along the reference line --; same column, lines 16 and 53, strike out "along the reference line", each occurrence.

Signed and sealed this 12th day of November 1963.

(SEAL)
Attest:

ERNEST W. SWIDER EDWIN L. REYNOLDS

Attesting Officer Acting Commissioner of Patents